United States Patent
Sakata et al.

(10) Patent No.: US 9,920,191 B2
(45) Date of Patent: Mar. 20, 2018

(54) SURFACE PROPERTY IMPROVING AGENT FOR MOLDED BODIES MADE OF POLYOLEFIN RESINS, RESIN COMPOSITION CONTAINING THE SAME, AND RESIN MOLDED BODY MADE THEREOF

(71) Applicant: NOF CORPORATION, Tokyo (JP)

(72) Inventors: Yusuke Sakata, Aichi (JP); Toru Tamura, Aichi (JP); Yasushi Sugihara, Aichi (JP)

(73) Assignee: NOF Corporation, Tokyo (JP)

( * ) Notice: Subject to any disclaimer, the term of this patent is extended or adjusted under 35 U.S.C. 154(b) by 357 days.

(21) Appl. No.: 14/419,422

(22) PCT Filed: Feb. 7, 2013

(86) PCT No.: PCT/JP2013/052820
§ 371 (c)(1),
(2) Date: Feb. 3, 2015

(87) PCT Pub. No.: WO2014/020923
PCT Pub. Date: Feb. 6, 2014

(65) Prior Publication Data
US 2015/0210842 A1    Jul. 30, 2015

(30) Foreign Application Priority Data

Aug. 3, 2012 (JP) ................... 2012-172969

(51) Int. Cl.
| | | |
|---|---|---|
| *C08L 23/00* | (2006.01) | |
| *C08L 23/12* | (2006.01) | |
| *C08K 5/01* | (2006.01) | |
| *C08L 43/04* | (2006.01) | |
| *C09D 183/10* | (2006.01) | |
| *C08G 77/442* | (2006.01) | |

(52) U.S. Cl.
CPC ............ *C08L 23/12* (2013.01); *C08K 5/01* (2013.01); *C08L 43/04* (2013.01); *C09D 183/10* (2013.01); *C08G 77/442* (2013.01); *C08L 2205/06* (2013.01)

(58) Field of Classification Search
CPC .......... C08L 43/04; C08L 91/08; C08L 91/06; C08L 23/12; C08F 220/56; C08K 5/01
See application file for complete search history.

(56) References Cited

U.S. PATENT DOCUMENTS

| | | | |
|---|---|---|---|
| 4,990,561 A | 2/1991 | Yoshioka | |
| 2004/0048177 A1* | 3/2004 | Tamoto | G03G 5/0557 430/58.2 |
| 2008/0076883 A1 | 3/2008 | Takeuchi et al. | |
| 2009/0207476 A1 | 8/2009 | Yanagisawa et al. | |

FOREIGN PATENT DOCUMENTS

| | | |
|---|---|---|
| EP | 940693 A2 | 9/1999 |
| JP | 02-183910 A | 7/1990 |
| JP | H02-194001 A | 7/1990 |
| JP | 02-269112 A | 11/1990 |
| JP | 07-196975 | 8/1995 |
| JP | 2000-119477 A | 4/2000 |
| JP | 2001-172576 A | 6/2001 |
| JP | 2006-143918 A | 6/2006 |
| JP | 2009-167352 A | 7/2009 |
| WO | WO2006/001510 A1 | 1/2006 |
| WO | WO 2013/170932 A1 | 11/2013 |

OTHER PUBLICATIONS

International Search Report for PCT/JP2013/052820, dated May 14, 2013, 5 pgs.
Safety Data Sheet (SDA No. CPS-E-2023M) for Product Name FM-0721, Manufactured by Chisso Corporation, Tokyo, Japan (Mar. 3, 2017) (3 pgs).

* cited by examiner

*Primary Examiner* — Peter D. Mulcahy
(74) *Attorney, Agent, or Firm* — Patterson Thuente Pedersen, P.A.

(57) ABSTRACT

A surface property-improving agent for molded bodies made of polyolefin resins contains 50.0 parts to 90.0 parts by mass of a non-polar wax with a melting point of 50° C. to 100° C. and 10.0 parts to 50.0 parts by mass of a vinyl copolymer obtained by copolymerizing two types of monomers (b1) and (b2). The sum of the non-polar wax and the vinyl copolymer is 100.0 parts by mass. The monomer (b1) is styrene and/or acrylonitrile. The vinyl copolymer contains 0.1 parts to 49.9 parts by mass of the monomer (b1) and 0.1 parts to 9.9 parts by mass of the monomer (b2) wherein the sum of the monomer (b1) and the monomer (b2) is 10.0 parts to 50.0 parts by mass. To 100.0 parts by mass of a polyolefin resin, 0.5 parts to 10.0 parts by mass of the agent is added. The monomer (b2) is a methacryloxypropyl polyorganosiloxane.

6 Claims, No Drawings

SURFACE PROPERTY IMPROVING AGENT FOR MOLDED BODIES MADE OF POLYOLEFIN RESINS, RESIN COMPOSITION CONTAINING THE SAME, AND RESIN MOLDED BODY MADE THEREOF

RELATED APPLICATIONS

The present application is a National Phase entry of PCT Application No. PCT/JP2013/052820, filed Feb. 7, 2013, which claims priority from JP Patent Application No. 2012-172969, filed Aug. 3, 2012, said applications being hereby incorporated by reference herein in their entirety.

BACKGROUND OF THE INVENTION

The present invention relates to a surface property-improving agent which can enhance the appearance and abrasion resistance of a molded body made of a polyolefin resin, which can suppress the bleeding of the molded body, and which can maintain the performance thereof even though being exposed to severe environments; a resin composition containing the same; and a resin-molded body made thereof.

Soft vinyl chloride resins, which have hitherto occupied the mainstream of materials for automotive interior parts such as automotive instrument panels and door trims, have recently been being replaced with polyolefin resins such as polypropylene, polyethylene, thermoplastic polyolefin elastomers because of advantages such as light weight, easiness in recycling, high cost performance, and no gas emission during combustion. However, there is a disadvantage in that automotive interior parts made of the polyolefin resins are inferior in abrasion resistance, wear resistance, and emboss retention to conventional automotive interior parts made of vinyl chloride resins.

Japanese Unexamined Patent Application Publication No. 2009-167352, which has been filed by the applicant, discloses a surface property-improving agent for compensating for this disadvantage. The surface property-improving agent disclosed in Japanese Unexamined Patent Application Publication No. 2009-167352 contains a non-polar wax with a melting point of 50° C. to 100° C. and a polymer produced by subjecting a mixed solution containing a vinyl monomer and a radical polymerization initiator to emulsion polymerization or suspension polymerization. The addition of the surface property-improving agent to a polyolefin resin suppresses the bleeding of a resin-molded body made of the polyolefin resin, odor, and fogging and enhances the appearance and abrasion resistance of the resin-molded body. Examples of the vinyl monomer include alkyl(meth)acrylates having an alkyl chain with one to 20 carbon atoms, vinyl monomers with an acid group, vinyl monomers with a hydroxyl group, vinyl monomers with an epoxy group, vinyl monomers with a cyano group, and the like.

The surface property-improving agent described in Japanese Unexamined Patent Application Publication No. 2009-167352 can maintain good surface properties in ordinary environments. However, it has become clear that there is a problem in that in the case of using the surface property-improving agent described in Japanese Unexamined Patent Application Publication No. 2009-167352, the abrasion resistance of a resin-molded body is significantly reduced by exposing the resin-molded body to a high-temperature environment for a long time.

Accordingly, there has been a need for an improved surface property-improving agent.

SUMMARY OF THE INVENTION

In an aspect of the present application, a surface property-improving agent for molded bodies made of polyolefin resins contains 50.0 parts to 90.0 parts by mass of a non-polar wax (A) with a melting point of 50° C. to 100° C. and 10.0 parts to 50.0 parts by mass of a vinyl copolymer (B) obtained by copolymerizing two types of monomers (b1) and (b2). The sum of the non-polar wax (A) and the vinyl copolymer (B) is 100.0 parts by mass. The monomer (b1) is styrene and/or acrylonitrile. The vinyl copolymer (B) contains 0.1 parts to 49.9 parts by mass of the monomer (b1) and 0.1 parts to 9.9 parts by mass of the monomer (b2). The sum of the monomer (b1) and the monomer (b2) is 10.0 parts to 50.0 parts by mass. The monomer (b2) is a methacryloxypropyl polyorganosiloxane represented by the following formula (1):

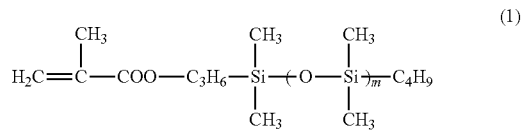

where m+1 is an integer.

The vinyl copolymer (B) is preferably formed in such a manner that the two types of monomers (b1) and (b2) are copolymerized in the presence of the non-polar wax (A) using a radical polymerization initiator. This is because performing polymerization in the presence of the non-polar wax (A) using the radical polymerization initiator causes the hydrogen abstraction reaction of the non-polar wax (A) to form a graft copolymer from the non-polar wax (A) and the monomers (b1) and (b2). The graft copolymer exhibits no affinity to, for example, a polyolefin resin and is composed of the non-polar wax (A), which is likely to be oriented on the surface of a resin-molded body, the monomer (b1), which is harder than the polyolefin resin and is different in polarity from the polyolefin resin, and the monomer (b2), which has a polyorganosiloxane group and therefore enhances the surface orientation of the surface property-improving agent.

In another aspect of the present application, a resin composition contains 0.5 parts to 10.0 parts by mass of the surface property-improving agent per 100.0 parts by mass of a polyolefin resin.

In another aspect of the present application, a resin-molded body is obtained by molding the resin composition.

Incidentally, the term "xx to yy" as used herein to express a numerical range includes the lower limit and upper limit thereof. Thus, the term "xx to yy" is accurately expressed as "greater than or equal to xx and less than or equal to yy".

According to the aspects, the abrasion resistance of the molded body made of the polyolefin resin can be enhanced by the lubricating effect of the non-polar wax (A). Furthermore, the resin-molded body can maintain excellent abrasion resistance by the effect of the methacryloxypropyl polyorganosiloxane monomer (b2) contained in the vinyl copolymer (B) even though being exposed to high-temperature conditions for a long time. Unlike conventional products, a resin-molded body contains none of low-molecular weight components such as silicone oils, aliphatic esters, and higher fatty acid amides; hence, bleeding does not occur the appearance of the molded body made of the polyolefin resin is not impaired.

DETAILED DESCRIPTION OF THE INVENTION

[Surface Property-Improving Agent]

A surface property-improving agent according to the present application is intended to improve surface properties of a molded body (hereinafter simply referred to as "polyolefin resin-molded body") made of a polyolefin resin and contains a non-polar wax (A) and a vinyl copolymer (B).

In the surface property-improving agent, the non-polar wax (A) and the vinyl co-monomer (B) serve as a trunk component and a branch component, respectively, and form a polymerized graft structure. The polyolefin resin-molded body has enhanced abrasion resistance and good appearance on the basis of properties of the graft structure. Thus, a polyolefin resin-molded body made of a resin composition containing the surface property-improving agent can be preferably used as automotive interior parts such as automotive instrument panels and door trims.

<Non-Polar Wax (A)>

The non-polar wax is a compound capable of exhibiting properties such as low frictional properties and mainly has the function of enhancing the abrasion resistance of the polyolefin resin-molded body. The non-polar wax can be selected from all known waxes having a melting point ranging from 50° C. to 100° C. and preferably 60° C. to 100° C. When the melting point thereof is lower than 50° C., Non-polar wax (A) has tacking properties (adhesive properties) and therefore is poor in operability and bleeding to the surface of the polyolefin resin-molded body is significant. On the other hand, the melting point thereof is higher than 100° C., orientation on the surface of the polyolefin resin-molded body is poor and therefore abrasion resistance is reduced. Examples of the non-polar wax include natural waxes, such as paraffin waxes and microcrystalline waxes, derived from petroleum synthetic waxes such as Fischer-Tropsch waxes and polyethylene waxes; and the like. In particular, a microcrystalline wax is preferred. Two or more these non-polar waxes (A) may be used in combination.

<Vinyl Copolymer (B)>

The vinyl copolymer is a copolymer produced by copolymerizing two types of monomers (b1) and (b2) using a radical polymerization initiator.

<<Monomer (b1)>>

The monomer (b1) used is preferably a monomer of which a polymer is harder than the polyolefin resin and which is oriented on the surface of the polyolefin resin-molded body by a rejection (elimination) effect due to the difference in polarity from the polyolefin resin to increase the effect of enhancing abrasion resistance. In particular, one or both of acrylonitrile and styrene can be used. Acrylonitrile and/or styrene has good copolymerizability with the monomer (b2) as described below and therefore further increases the effect of enhancing abrasion resistance as compared to the case of using other monomers.

<<Monomer (b2)>>

The monomer (b2) used is a methacryloxypropyl polyorganosiloxane represented by the following formula (1):

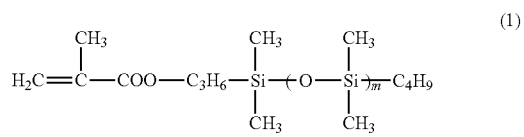

where m+1 is an integer.

The monomer (b2) has a polyorganosiloxane group and therefore can enhance the surface orientation of the surface property-improving agent. The polyorganosiloxane group has low surface free energy and therefore is likely to be oriented on the air side. In the polyolefin resin-molded body, the surface property-improving agent is oriented on the surface thereof. Thus, when the surface property-improving agent contains the methacryloxypropyl polyorganosiloxane as the monomer (b2), the surface property-improving agent remains present on the surface of the polyolefin resin-molded body even though the polyolefin resin-molded body is exposed to high-temperature conditions for a long time; hence, the abrasion resistance of the polyolefin resin-molded body can be maintained. However, when the surface property-improving agent does not contain the methacryloxypropyl polyorganosiloxane, the surface property-improving agent gradually migrates from the surface to the inside of the polyolefin resin-molded body and therefore the abrasion resistance of the polyolefin resin-molded body is reduced in the case where the polyolefin resin-molded body is exposed to high-temperature conditions. Incidentally, m in Formula (1) is preferably 5 to 500. A plurality of methacryloxypropyl polyorganosiloxanes different in number-average molecular weight Mn from each other can be used in combination.

<Radical Polymerization Initiator>

The radical polymerization initiator is a compound that initiates the radical polymerization of the monomers (b1) and (b2) and a commonly known azo polymerization initiator, an organic peroxide, a persulfate, aqueous hydrogen peroxide, a redox polymerization initiator (a polymerization initiator containing a combination of an oxidizing agent and a reducing agent), or the like can be used.

Examples of the azo polymerization initiator include azobisisobutyronitrile, azobisisovaleronitrile, azobisdimethylvaleronitrile, azobis(4-methoxy-2,4-dimethylvaleronitrile), 1-phenylethylazodiphenylmethane, and the like.

Examples of the organic peroxide include peroxyketals such as 1,1-di(t-hexylperoxy)-3,3,5-trimethylcyclohexane and 1,1-di(t-hexylperoxy)cyclohexane; hydroperoxides such as p-menthane hydroperoxide, diisopropylbenzene hydroperoxide, 1,1,3,3-tetramethylbutyl hydroperoxide, cumene hydroperoxide, and t-butyl hydroperoxide; diacyl peroxides such as di(3,5,5-trimethylhexanoyl) peroxide and dibenzoyl peroxide; peroxyesters such as cumyl peroxyneodecanoate and t-butyl peroxyneodecanoate; and the like.

A hydroperoxide or a persulfate can be used as an oxidizing agent for use in the redox polymerization initiator. Examples of the hydroperoxide include cumene hydroperoxide, t-butyl hydroperoxide, diisopropylbenzene hydroperoxide, p-menthane hydroperoxide, 1,1,3,3-tetramethylbutyl hydroperoxide, and the like. Examples of the persulfate include potassium persulfate, ammonium persulfate, and the like. Examples of a reducing agent include glucose, dextrose, sodium formaldehyde sulfoxylate (rongalite), sodium thiosulfate, ferrous sulfate, copper sulfate, potassium hexacyanoferrate (III), and the like.

Among the above-exemplified radical polymerization initiators, di(3,5,5-trimethylhexanoyl) peroxide or potassium persulfate is preferred.

<Method for Producing Vinyl Copolymer (B)>

The vinyl copolymer can be synthesized by a known suspension or emulsion polymerization method using the radical polymerization initiator. In this method, 0.1 parts to 49.9 parts by mass of the monomer (b1) is blended with 0.1 parts to 9.9 parts by mass of the monomer (b2) such that the sum of the monomer (b1) and the monomer (b2) is 10.0 parts to 50.0 parts by mass. When the blending ratio (content) of the monomers (b1) and (b2) is outside this range, surface properties of the polyolefin resin-molded body are reduced as a result.

The amount (content) of the blended radical polymerization initiator is preferably 0.001 parts to 10.0 parts by mass and more preferably 0.01 parts to 5.0 parts by mass with respect to the total amount, 100.0 parts by mass, of the monomers (b1) and (b2). When the content of the radical polymerization initiator is less than 0.001 parts by mass, a long time is not only needed to complete polymerization but also reaction is not completed, which is not preferred. However, when the content thereof is more than 10.0 parts by mass, the heat generated by reaction is large and therefore the control of a polymerization reaction tends to be difficult.

In the case of synthesizing the vinyl copolymer (B) by the emulsion polymerization method, a surfactant is mixed with a vinyl monomer. The surfactant used in the emulsion polymerization method may be a known nonionic, anionic, or cationic surfactant. In the case of isolating a polymer by salting, the anionic surfactant is preferred. Examples of the anionic surfactant include fatty acid salts, sodium alkylbenzenesulfonates, alkylnaphthalenesulfonates, dialkyl sulfosuccinates, alkyl phosphates, naphthalenesulfonic acid-formaldehyde condensates, alkyl polyoxyethylene sulfonates, and the like. These surfactants may be blended with the total amount, 100.0 parts by mass, of the monomers (b1) and (b2) in a proportion of about 0.1 parts to 10.0 parts by mass and preferably 1.0 part to 5.0 parts by mass.

In emulsion polymerization, a known pH adjuster, chelating agent, viscosity adjuster, polymerization stabilizer, or the like can be used as required. The following compound is cited: for example, a pH adjuster such as sodium hydroxide, potassium hydroxide, ammonium hydroxide, hydrogen sodium carbonate, sodium carbonate, or disodium hydrogen phosphate; a chelating agent such as sodium ethylenediaminetetraacetate or sodium pyrophosphate; a viscosity adjuster containing an inorganic electrolyte, an organic electrolyte, a polymeric electrolyte, or the like; a polymerization stabilizer; or the like. Furthermore, a known cross-linking agent, chain transfer agent, polymerization initiator, or the like can be used to control the degree of polymerization.

After polymerization is completed, an emulsion obtained by emulsion polymerization is salted out with, for example, an acid such as hydrochloric acid, sulfuric acid, or nitric acid or an electrolyte such as sodium chloride, potassium chloride, sodium sulfate, calcium chloride, magnesium sulfate, copper sulfate, or calcium nitrate, followed by filtering and drying, whereby a polymer is obtained.

In the case of synthesizing the vinyl copolymer (B) by the suspension polymerization method, a dispersant is mixed with the vinyl monomer. The dispersant used may be an inorganic compound or an organic compound. Examples of the inorganic compound include tricalcium phosphate, magnesium phosphate, aluminium phosphate, zinc phosphate, calcium carbonate, magnesium carbonate, potassium hydroxide, magnesium hydroxide, aluminium hydroxide, calcium metasilicate, calcium sulfate, barium sulfate, bentonite, silica, alumina, magnetic substances, ferrite, and the like. Examples of the organic compound include polyvinyl alcohol, gelatin, methylcellulose, methylhydroxypropylcellulose, ethylcellulose, methylcellulose, a sodium salt of carboxymethylcellulose, starch, and the like. The dispersant is used in such a manner that it is dispersed or dissolved in an aqueous phase. The amount of the blended dispersant is preferably about 0.01 parts to 10.0 parts by mass and more preferably about 0.01 parts to 1.0 part by mass with respect to the total amount, 100.0 parts by mass, of the monomers (b1) and (b2).

After suspension polymerization is completed, filtering and drying are performed, whereby the polymer is obtained.

The mass-average molecular weight (a value determined by gel permeation chromatography (GPC) in tetrahydrofuran (THF) in terms of styrene) of the polymer formed from the monomers (b1) and (b2) is usually 1,000 to 6,000,000 and preferably 10,000 to 4,000,000. When the mass-average molecular weight thereof is less than 1,000, the heat resistance of the polymer tends to be low. When the mass-average molecular weight thereof is more than 6,000,000, the fluidity of the melted polymer is poor and the formability thereof tends to be low.

<Method for Producing Surface Property-Improving Agent>

The surface property-improving agent according to the present application can be obtained by mixing the non-polar wax (A) and the vinyl copolymer (B) together at a temperature not lower than the melting point of the non-polar wax (A). In this operation, after being produced, the vinyl copolymer (B) may be mixed with the non-polar wax (A). Alternatively, the vinyl copolymer (B) may be produced in the presence of the non-polar wax (A) in such a manner that the monomer (b1) and the monomer (b2) are charged into the same vessel. The case of producing the vinyl copolymer (B) in the presence of the non-polar wax (A) is preferred in that the non-polar wax (A) and the vinyl copolymer (B) form the graft structure.

The blending ratio (content) of the non-polar wax (A) and the vinyl copolymer (B) is as follows: the non-polar wax (A) and vinyl copolymer (B) in 100.0 parts by mass (A+B=100.0 parts by mass) of the surface property-improving agent are 50.0 parts to 90.0 parts by mass and 10.0 parts to 50.0 parts by mass, respectively. When the non-polar wax (A) is less than 50.0 parts by mass, the amount of a slip additive contained in the surface property-improving agent is small and therefore the abrasion resistance of the polyolefin resin-molded body is reduced. On the other hand, when the vinyl copolymer (B) is less than 10.0 parts by mass, the amount of the monomer (b2) contained in the surface property-improving agent is small as a result and the polyolefin resin-molded body is reduced in abrasion resistance when being exposed to high temperature.

[Resin Composition]

A resin composition according to the present application contains the surface property-improving agent and a polyolefin resin which is a main component.

The polyolefin resin is an α-olefin resin, a thermoplastic elastomer, or the like. Examples of an α-olefin forming the α-olefin resin include, for example, ethylene, propylene, 1-butene, 1-pentene, 3-methyl-1-butene, 1-hexene, 1-decene, 3-methyl-1-pentene, 4-methyl-1-pentene, 1-octene, mixtures of these compounds, and the like. Examples of the α-olefin resin include polyethylene and polypropylene.

The thermoplastic elastomer is an olefinic thermoplastic elastomer and may include a styrenic thermoplastic elastomer and the like. An example of the olefinic thermoplastic elastomer is, for example, a blend of polypropylene and ethylene-propylene rubber, a cross-linked product thereof, a blend of polyethylene and ethylene-propylene rubber, a cross-linked product thereof, a blend of polypropylene and ethylene-propylene-non-conjugated polyene rubber, a cross-linked product thereof, a blend of polyethylene and ethylene-propylene-non-conjugated polyene rubber, a cross-linked product thereof, a blend of polypropylene and hydrogenated styrene-butadiene rubber (SEBS), a cross-linked product thereof, a blend of polypropylene and ethylene-1-octene rubber, a cross-linked product thereof, a blend of polyethylene and ethylene-1-octene rubber, a cross-linked product thereof, or the like.

An example of the styrenic thermoplastic elastomer is, for example, styrene-butadiene rubber (SBR), a hydrogenated product (H-SBR) thereof, styrene-butadiene-styrene block copolymer (SBS), a hydrogenated product (SEBS) thereof, styrene-isoprene-styrene block copolymer (SIS), a hydrogenated product (SEPS, HV-SIS) thereof, or the like.

The α-olefin resin and the thermoplastic elastomer may be used alone or in combination. Cross-linking is performed by a known method. In particular, cross-linking is preferably performed using an organic peroxide.

The content of the surface property-improving agent in the resin composition is 0.5 parts to 10.0 parts by mass and preferably 1.0 part to 10.0 parts by mass per 100.0 parts by mass of the polyolefin resin. When the surface property-improving agent is less than 0.5 parts by mass per 100.0 parts by mass of the polyolefin resin, sufficient abrasion resistance cannot be obtained in the polyolefin resin-molded body made of the resin composition. However, when the surface property-improving agent is more than 10.0 parts by mass per 100.0 parts by mass of the polyolefin resin, the formability of the polyolefin resin-molded body is low and the mechanical strength of the polyolefin resin-molded body is also low.

The resin composition may contain another resin, rubber, or inorganic filler. Examples of such resin or rubber include ethylenic copolymers such as ethylene-acrylic acid copolymers, ethylene-methyl acrylate copolymers, ethylene-methyl methacrylate copolymers, ethylene-ethyl acrylate copolymers, ethylene-isobutyl acrylate copolymers, ethylene-n-butyl acrylate copolymers, ethylene-2-ethylhexyl acrylate copolymers, ethylene-ethyl acrylate-maleic anhydride copolymers, ethylene-ethyl acrylate-glycidyl methacrylate copolymers, ethylene-glycidyl methacrylate copolymers, ethylene-vinyl acetate copolymers, or saponified products thereof; ethylene/α-olefin rubber including ethylene-propylene rubber, ethylene-propylene-non-conjugated polyene rubber, ethylene-butene rubber, ethylene-butene-non-conjugated polyene rubber, ethylene-hexene rubber, and ethylene-octene rubber; butyl rubber; polyisobutylene rubber; nitrile rubber (NBR); natural rubber (NR); acrylic rubber (ACM); silicone rubber; and the like.

Examples of the inorganic filler include calcium carbonate, calcium silicate, clay, kaolin, talc, silica, diatomaceous earth, mica powder, asbestos, alumina, barium sulfate, aluminium sulfate, calcium sulfate, basic magnesium carbonate, molybdenum disulfide, graphite, glass fibers, glass beads, Shirasu balloons, basic magnesium sulfate whiskers, calcium titanate whiskers, aluminium borate whiskers, and the like.

The resin composition may contain a slip additive. Examples of the slip additive include saturated fatty acid amides such as lauramide, palmitamide, stearamide, and behenamide; unsaturated fatty acid amides such as erucamide, oleamide, brassidamide, and elaidamide; bis-fatty acid amides such as methylene bis-stearamide, methylene bis-oleamide, ethylene bis-stearamide, and ethylene bis-oleamide; fatty acid esters such as methyl laurate, methyl myristate, methyl palmitate, methyl stearate, methyl oleate, methyl erucate, methyl behenate, butyl laurate, butyl stearate, isopropyl myristate, isopropyl palmitate, octyl palmitate, octyl cocoate, octyl stearate, lauryl laurate, stearyl stearate, behenyl behenate, cetyl myristate, neopentyl polyol esters of long-chain fatty acids, neopentyl polyol esters of fatty acids, and pentaerythritol tetrapalmitate; hydrocarbons such as polyethylene waxes and polypropylene waxes; fatty acids such as stearic acid and 1,2-dihydroxystearic acid; higher alcohols such as stearyl alcohol; metal soaps such as calcium stearate, zinc stearate, and magnesium stearate; silicones such as silicone oils; fluorinated resins such as polytetrafluoroethylene; alkylene glycols such as polyethylene glycol, ethylene glycol monomethyl ether, and ethylene glycol dimethyl ether; and the like.

The resin composition may further contain an arbitrary additive such as a known anti-aging agent, nucleating agent, or colorant.

<Method for Producing Resin Composition>

The resin composition is prepared in such a manner that the surface property-improving agent and the polyolefin resin are mixed together, are heated, are melted, and are kneaded. In this operation, the heating temperature is preferably about 70° C. to 300° C. When the heating temperature is lower than 70° C., phase separation or delamination tends to occur because the kneading of the polyolefin resin and the surface property-improving agent is incomplete or the mixing thereof is insufficient due to high melt viscosity. However, when the heating temperature is higher than 300° C., the document decomposition of the polyolefin resin and the surface property-improving agent tends to be vigorous. The following method is used as a melting or mixing method: a known method such as a kneading method using a single-screw extruder, a twin-screw extruder, a Banbury mixer, a kneader, or a roll.

[Resin-Molded Body]

A resin-molded body is obtained in such a manner that the resin composition is molded into a predetermined shape. Effects of the surface property-improving agent, which is contained in the resin composition, are exhibited. The form of the resin-molded body is a sheet, a film, a hollow body, a block, a plate, a cylinder, a complex-shaped body, or the like and is not particularly limited. A molding method is not particularly limited; may be a common method for molding a thermoplastic resin; and includes a calendar molding method, a pressure forming method, a hot forming method, a blow molding method, a foam molding method, an extrusion molding method, an injection molding method, a vacuum forming method, a powder slush molding method, and the like. The resin-molded body has an excellent surface property-improving effect and thermal stability and therefore can be used for various products and semi-products, such as automotive parts, appliance parts, and sundries, in wide fields.

EXAMPLES

The present invention is described below in detail with reference to examples and comparative examples. The scope of the present invention is not limited to these examples.

Example 1-1-1-1

Into a reaction vessel with a volume of 0.5 L, 50.0 g of a microcrystalline wax (a melting point of 69.7° C.) as a non-polar wax (A), 18.0 g of styrene as a monomer (b1), 27.0 g of acrylonitrile, and 1.0 g of methacryloxypropyl polydimethylsiloxane (a number-average molecular weight Mn of 5,000) as a monomer (b2) were charged and 280 g of water, 1.6 g of calcium tertiary phosphate as a dispersant, 0.4 g of hydroxypropylmethyl cellulose, and 0.02 g of an α-methylstyrene dimer as a molecular weight modifier were also charged, followed by heating at 70° C. and stirring for 30 minutes.

Subsequently, 1.9 g of styrene as a monomer (b1), 3.0 g of acrylonitrile, and 0.66 g of di(3,5,5-trimethylhexanoyl) peroxide as a radical polymerization initiator were mixed together and were charged into the reaction vessel, followed by stirring and reaction at 70° C. for 3 hours. Next, 0.1 g of potassium persulfate as a radical polymerization initiator was dissolved in 0.5 g of water and was charged into the reaction vessel, followed by stirring and reaction at 70° C. for 1 hour. Thereafter, cooling to 40° C. or lower, filtration, and a drying step were performed, whereby a surface property-improving agent of Example 1-1-1-1 was obtained.

Examples 1-1-1-2 to 1-1-4-7 and Comparative Examples 1-1-1-1 to 1-1-1-4

Surface property-improving agents of Examples 1-1-1-2 to 1-1-4-7 and Comparative Examples 1-1-1-1 to 1-1-1-4 were obtained by performing substantially the same operation as that described in Example 1-1-1-1 except that the amounts of the blended non-polar wax (A), monomer (b1), and monomer (b2) were varied as shown in Tables 1 to 4.

Incidentally, abbreviations used in Tables 1 to 4 represent components below.

MCW: microcrystalline wax (a melting point of 69.7° C.)

PW: paraffin wax (a melting point of 69° C.)

St: styrene monomer

AN: acrylonitrile

PDMS: methacryloxypropyl polyorganosiloxane

In Tables 1 and 3, the number-average molecular weight (Mn) of PDMS, which represents the monomer (b2), is 5,000. On the other hand, in Tables 2 and 4, the number-average molecular weight (Mn) of PDMS 1, which represents the monomer (b2), is 5,000 and the number-average molecular weight (Mn) of PDMS 2 is 10,000.

TABLE 1

| Example or Comparative Example | Non-polar wax (A) Name of wax (melting point (° C.)) Parts by mass | Vinyl copolymer (B) Composition of vinyl copolymer (B) Parts by mass | | Whether graft is present or not |
|---|---|---|---|---|
| | | Monomer (b1) Parts by mass | Monomer (b2) Parts by mass | |
| Example 1-1-1-1 | MCW (melting point 69.7° C.) 50.0 | St/AN/PDMS 50.0 | | Present |
| | | St/AN 19.9/30.0 | PDMS 0.1 | |
| Example 1-1-1-2 | MCW (melting point 69.7° C.) 69.0 | St/AN/PDMS 31.0 | | Present |
| | | St/AN 24.0/6.0 | PDMS 1.0 | |
| Example 1-1-1-3 | MCW (melting point 69.7° C.) 90.0 | St/AN/PDMS 10.0 | | Present |
| | | St/AN 0.1/0.1 | PDMS 9.8 | |
| Example 1-1-2-1 | MCW (melting point 69.7° C.) 90.0 | St/PDMS 10.0 | | Present |
| | | St 9.9 | PDMS 0.1 | |
| Example 1-1-2-2 | MCW (melting point 69.7° C.) 69.0 | St/PDMS 31.0 | | Present |
| | | St 30.0 | PDMS 1.0 | |
| Example 1-1-2-3 | MCW (melting point 69.7° C.)/ PW (melting point 69° C.) 69.0 | St/PDMS 31.0 | | Present |
| | MCW 60.0 / PW 9.0 | St 30.0 | PDMS 1.0 | |
| Example 1-1-2-4 | MCW (melting point 69.7° C.) 50.0 | St/PDMS 50.0 | | Present |
| | | St 40.1 | PDMS 9.9 | |
| Example 1-1-3-1 | MCW (melting point 69.7° C.) 50.0 | AN/PDMS 50.0 | | Present |
| | | AN 49.9 | PDMS 0.1 | |
| Example 1-1-3-2 | MCW (melting point 69.7° C.) 69.0 | AN/PDMS 31.0 | | Present |
| | | AN 30.0 | PDMS 1.0 | |

TABLE 1-continued

Composition of surface property-improving agent

| Example or Comparative Example | Non-polar wax (A) Name of wax (melting point (° C.)) Parts by mass | Vinyl copolymer (B) Composition of vinyl copolymer (B) Parts by mass | | Whether graft is present or not |
|---|---|---|---|---|
| | | Monomer (b1) Parts by mass | Monomer (b2) Parts by mass | |
| Example 1-1-3-3 | MCW (melting point 69.7° C.) 90.0 | AN/PDMS 10.0 AN 0.1 | PDMS 9.9 | Present |

TABLE 2

Composition of surface property-improving agent

| Example or Comparative Example | Non-polar wax (A) Name of wax Parts by mass | Vinyl copolymer (B) Composition of vinyl copolymer (B) Parts by mass | | Whether graft is present or not |
|---|---|---|---|---|
| | | Monomer (b1) Parts by mass | Monomer (b2) Parts by mass | |
| Example 1-1-4-1 | MCW 50.0 | St/AN/PDMS 50.0 St/AN 30/19.9 | PMDS② 0.1 | Present |
| Example 1-1-4-2 | MCW 50.0 | St/PDMS 50.0 St 40.1 | PMDS② 9.9 | Present |
| Example 1-1-4-3 | MCW 50.0 | AN/PDMS 50.0 AN 49.9 | PMDS② 0.1 | Present |
| Example 1-1-4-4 | MCW 69.0 | St/AN/PDMS 31.0 St/AN 22.4/5.6 | PDMS①/PMDS② 1.5/1.5 | Present |
| Example 1-1-4-5 | MCW 90.0 | St/AN/PDMS 10.0 St/AN 0.1/0.1 | PDMS①/PMDS② 9.7/0.1 | Present |
| Example 1-1-4-6 | MCW 90.0 | St/PDMS 10.0 St 9.8 | PDMS①/PMDS② 0.1/0.1 | Present |
| Example 1-1-4-7 | MCW 90.0 | AN/PDMS 10.0 AN 0.1 | PDMS①/PMDS② 0.1/9.8 | Present |

Example 1-2-1-1

Into a reaction vessel with a volume of 0.5 L, 21.6 g of styrene as a monomer (b1), 5.4 g of acrylonitrile, and 1.0 g of methacryloxypropyl polydimethylsiloxane as a monomer (b2) were charged and 280 g of water, 1.6 g of calcium tertiary phosphate as a dispersant, 0.4 g of hydroxypropylmethyl cellulose, and 0.02 g of an α-methylstyrene dimer as a molecular weight modifier were also charged, followed by heating at 70° C. and stirring for 30 minutes.

Subsequently, 2.4 g of styrene as a monomer (b1), 0.6 g of acrylonitrile, and 0.66 g of di(3,5,5-trimethylhexanoyl) peroxide as a radical polymerization initiator were mixed together and were charged into the reaction vessel, followed by stirring and reaction at 70° C. for 3 hours. Next, 0.1 g of potassium persulfate as a radical polymerization initiator was dissolved in 0.5 g of water and was charged into the reaction vessel, followed by stirring and reaction at 70° C. for 1 hour. Thereafter, cooling to 40° C. or lower, filtration, and a drying step were performed, whereby a vinyl copolymer was obtained. Finally, 31.0 g of the vinyl copolymer was dry-blended with 69.0 g of a microcrystalline wax as a non-polar wax (A), whereby a surface property-improving agent of Example 1-2-1-1 was obtained.

Examples 1-2-2-1 to 1-2-4-1 and Comparative Examples 1-2-1-1 to 1-2-1-4

Surface property-improving agents of Examples 1-2-2-1 to 1-2-4-1 and Comparative Examples 1-2-1-1 to 1-2-1-4 were obtained by performing substantially the same operation as that described in Example 1-2-1-1 except that the amounts of the blended non-polar wax (A), monomer (b1), and monomer (b2) were varied as shown in Tables 3 and 4.

TABLE 3

Composition of surface property-improving agent

| Example or Comparative Example | Non-polar wax (A) Name of wax (melting point (° C.)) Parts by mass | Vinyl copolymer (B) Composition of vinyl copolymer (B) Parts by mass Monomer (b1) Parts by mass | Monomer (b2) Parts by mass | Whether graft is present or not |
|---|---|---|---|---|
| Example 1-2-1-1 | MCW (melting point 69.7° C.) 69.0 | St/AN/PDMS 31.0 St/AN 24.0/6.0 | PDMS 1.0 | Not present |
| Example 1-2-2-1 | MCW (melting point 69.7° C.) 69.0 | St/PDMS 31.0 St 30.0 | PDMS 1.0 | Not present |
| Example 1-2-3-1 | MCW (melting point 69.7° C.) 69.0 | AN/PDMS 31.0 AN 30.0 | PDMS 1.0 | Not present |
| Comparative Example 1-1-1-1 | MCW (melting point 69.7° C.) 70.0 | St/AN 30.0 St/AN 24.0/6.0 | PDMS 0.0 | Present |
| Comparative Example 1-1-1-2 | MCW (melting point 69.7° C.) 70.0 | St/AN/PDMS 30.0 St/AN 8.0/2.0 | PDMS 20.0 | Present |
| Comparative Example 1-1-1-3 | MCW (melting point 69.7° C.) 39.0 | St/AN/PDMS 61.0 St/AN 48.0/12.0 | PDMS 1.0 | Present |
| Comparative Example 1-2-1-1 | MCW (melting point 69.7° C.) 70.0 | St/AN 30.0 St/AN 24.0/6.0 | PDMS 1.0 | Not present |
| Comparative Example 1-2-1-2 | MCW (melting point 69.7° C.) 70.0 | St/AN/PDMS 30.0 St/AN 8.0/2.0 | PDMS 20.0 | Not present |
| Comparative Example 1-2-1-3 | MCW (melting point 69.7° C.) 39.0 | St/AN/PDMS 61.0 St/AN 48.0/12.0 | PDMS 1.0 | Not present |

40

TABLE 4

Composition of surface property-improving agent

| Example or Comparative Example | Non-polar wax (A) Name of wax Parts by mass | Vinyl copolymer (B) Composition of vinyl copolymer (B) Parts by mass Monomer (b1) Parts by mass | Monomer (b2) Parts by mass | Whether graft is present or not |
|---|---|---|---|---|
| Example 1-2-4-1 | MCW 69.0 | St/AN/PDMS 31.0 St/AN 22.4/5.6 | PDMS①/PMDS② 1.5/1.5 | Not present |
| Comparative Example 1-1-1-4 | MCW 39.0 | St/AN/PDMS 61.0 St/AN 46.4/11.6 | PDMS①/PMDS② 1.5/1.5 | Present |
| Comparative Example 1-2-1-4 | MCW 39.0 | St/AN/PDMS 61.0 St/AN 46.4/11.6 | PDMS①/PMDS② 1.5/1.5 | Not present |

[Polyolefin Resin-Molded Bodies]

Example 2-1-1-1

With 3 g of the surface property-improving agent of Example 1-1-1-1, 100 g of block polypropylene (b-PP) as a polyolefin resin was dry-blended. The blend was melted and kneaded at a cylinder temperature of 200° C. with a twin-screw extruder, whereby a polyolefin resin composition was obtained. The polyolefin resin composition was molded with an injection molding machine at a cylinder temperature of 190° C. and a die temperature of 50° C. using a die for a No. 1 specimen specified in JIS K 7113, whereby a polyolefin resin-molded body of Example 2-1-1-1 was obtained.

Examples 2-1-1-2 to 2-3-2-1 and Comparative Examples 2-2-1-1 to 2-2-2-3

Polyolefin resin-molded bodies of Examples 2-1-1-2 to 2-3-2-1 and Comparative Examples 2-2-1-1 to 2-2-2-3 were obtained by substantially the same operation as that described in Example 2-1-1-1 except that the surface property-improving agents of Examples 1-1-1-2 to 1-2-3-1 and Comparative Examples 1-1-1-1 to 1-2-1-3 were used.

Comparative Example 2-1-1-1

A polyolefin resin-molded body of Comparative Example 2-1-1-1 was obtained by substantially the same operation as that described in Example 2-1-1-1 except that 100 g of block polypropylene (b-PP) only was used as a polyolefin resin.

Comparative Examples 2-1-1-2 and 2-1-1-3

Polyolefin resin-molded bodies of Comparative Examples 2-1-1-2 and 2-1-1-3 were obtained by substantially the same operation as that described in Example 2-1-1-1 except that the surface property-improving agent was changed to a microcrystalline wax and silicone oil, respectively.

Next, properties of the obtained polyolefin resin-molded body of each of the examples and the comparative examples were evaluated by methods below and in accordance with judging standards below. The results are shown in Tables 5 to 8.

<Bleeding>

The surface of each polyolefin resin-molded body was rubbed with a finger. The case where no oil film was attached to the finger was rated A. The case where an oil film was attached to the finger was rated B.

<Formability>

During the formation of each polyolefin resin-molded body, the case where common molding failures such as silver streaks, flow marks, and sink marks did not occur was rated A. The case where such molding failures occurred was rated B.

<Mechanical Properties>

Each polyolefin resin-molded body was subjected to tensile testing in accordance with JIS K 7113. The case where no reduction in strength was observed was rated A. The case where a reduction in strength was observed was rated B.

<Initial Abrasion Resistance>

Each polyolefin resin-molded body was tested in accordance with ISO FDIS 19252 using a scratch tester, KK-01, manufactured by Kato tech Co., Ltd. and a stainless steel chip with a diameter of 1.0 mm under the following conditions: a scratch load of 1 N to 30 N, a scratch distance of 100 mm, and a scratch speed of 100 mm/s.

<Abrasion Resistance after Thermal Loading>

After being left stationary in a 120° C. thermostatic chamber with an-air blowing function for 120 hours, each polyolefin resin-molded body was adjusted in a 23° C. thermostatic chamber with a relative humidity of 50% for 24 hours or more and was then tested by the same operation as that used to evaluate initial abrasion resistance.

TABLE 5

| Example or Comparative Example | Surface property-improving agent Type | Additive amount Parts by mass | Polyolefin resin-molded body (IV) Type of polyolefin | Bleeding | Formability | Mechanical properties | Initial abrasion resistance [N] | Abrasion resistance after thermal loading [N] |
|---|---|---|---|---|---|---|---|---|
| Example 2-1-1-1 | Example 1-1-1-1 | 3.0 | b-PP | A | A | A | 15.0 | 12.4 |
| Example 2-1-1-2 | Example 1-1-1-2 | 3.0 | b-PP | A | A | A | 23.8 | 22.2 |
| Example 2-1-1-3 | Example 1-1-1-3 | 3.0 | b-PP | A | A | A | 19.7 | 17.5 |
| Example 2-1-2-1 | Example 1-1-2-1 | 3.0 | b-PP | A | A | A | 19.0 | 12.9 |
| Example 2-1-2-2 | Example 1-1-2-2 | 3.0 | b-PP | A | A | A | 23.5 | 21.9 |
| Example 2-1-2-3 | Example 1-1-2-3 | 3.0 | b-PP | A | A | A | 17.8 | 15.2 |
| Example 2-1-2-4 | Example 1-1-2-4 | 3.0 | b-PP | A | A | A | 15.3 | 14.6 |
| Example 2-1-3-1 | Example 1-1-3-1 | 3.0 | b-PP | A | A | A | 15.6 | 12.7 |
| Example 2-1-3-2 | Example 1-1-3-2 | 3.0 | b-PP | A | A | A | 23.2 | 22.0 |
| Example 2-1-3-3 | Example 1-1-3-3 | 3.0 | b-PP | A | A | A | 19.4 | 17.1 |
| Example 2-2-1-1 | Example 1-2-1-1 | 3.0 | b-PP | A | A | A | 22.8 | 9.7 |

TABLE 5-continued

| Example or Comparative Example | Surface property-improving agent Type | Additive amount Parts by mass | Polyolefin resin-molded body (IV) Type of polyolefin | Bleeding | Form-ability | Mechanical properties | Initial abrasion resistance [N] | Abrasion resistance after thermal loading [N] |
|---|---|---|---|---|---|---|---|---|
| Example 2-2-1-2 | Example 1-2-2-1 | 3.0 | b-PP | A | A | A | 22.5 | 9.1 |
| Example 2-2-1-3 | Example 1-2-3-1 | 3.0 | b-PP | A | A | A | 22.7 | 8.9 |
| Example 2-3-1-1 | Example 1-1-1-1 | 0.5 | b-PP | A | A | A | 15.6 | 13.7 |
| Example 2-3-1-2 | Example 1-1-1-1 | 10.0 | b-PP | A | A | A | 19.2 | 17.7 |

TABLE 6

| Example or Comparative Example | Surface property-improving agent Type | Additive amount Parts by mass | Polyolefin resin-molded body Type of polyolefin | Bleeding | Form-ability | Mechanical properties | Initial abrasion resistance [N] | Abrasion resistance after thermal loading [N] |
|---|---|---|---|---|---|---|---|---|
| Example 2-1-4-1 | Example 1-1-4-1 | 3.0 | b-PP | A | A | A | 13.8 | 12.2 |
| Example 2-1-4-2 | Example 1-1-4-2 | 3.0 | b-PP | A | A | A | 14.6 | 13.9 |
| Example 2-1-4-3 | Example 1-1-4-3 | 3.0 | b-PP | A | A | A | 14.8 | 12.0 |
| Example 2-1-4-4 | Example 1-1-4-4 | 3.0 | b-PP | A | A | A | 25.0 | 23.8 |
| Example 2-1-4-5 | Example 1-1-4-5 | 3.0 | b-PP | A | A | A | 22.4 | 20.1 |
| Example 2-1-4-6 | Example 1-1-4-6 | 3.0 | b-PP | A | A | A | 22.2 | 14.1 |
| Example 2-1-4-7 | Example 1-1-4-7 | 3.0 | b-PP | A | A | A | 22.5 | 20.0 |
| Example 2-2-1-4 | Example 1-2-4-1 | 3.0 | b-PP | A | A | A | 23.9 | 10.1 |

TABLE 7

| Example or Comparative Example | Surface property-improving agent Type | Additive amount Parts by mass | Polyolefin resin-molded body Type of polyolefin | Bleeding | Form-ability | Mechanical properties | Initial abrasion resistance [N] | Abrasion resistance after thermal loading [N] |
|---|---|---|---|---|---|---|---|---|
| Comparative Example 2-1-1-1 | — | — | b-PP | A | A | A | 6.0 | 3.2 |
| Comparative Example 2-1-1-2 | 155° micro-wax only | 3.0 | b-PP | A | A | A | 19.8 | 3.8 |
| Comparative Example 2-1-1-3 | Silicone oil only | 3.0 | b-PP | B | B | B | 7.0 | 6.9 |
| Comparative Example 2-2-1-1 | Comparative Example 1-1-1-1 | 3.0 | b-PP | A | A | A | 22.7 | 4.2 |

TABLE 7-continued

| Example or Comparative Example | Surface property-improving agent Type | Additive amount Parts by mass | Polyolefin resin-molded body Type of polyolefin | Bleeding | Form-ability | Mechanical properties | Initial abrasion resistance [N] | Abrasion resistance after thermal loading [N] |
|---|---|---|---|---|---|---|---|---|
| Comparative Example 2-2-1-2 | Comparative Example 1-1-1-2 | 3.0 | b-PP | B | A | B | 10.2 | 8.3 |
| Comparative Example 2-2-1-3 | Comparative Example 1-1-1-3 | 3.0 | b-PP | A | A | A | 9.9 | 8.1 |
| Comparative Example 2-2-2-1 | Comparative Example 1-2-1-1 | 3.0 | b-PP | A | A | A | 10.5 | 8.0 |
| Comparative Example 2-2-2-2 | Comparative Example 1-2-1-2 | 3.0 | b-PP | B | A | B | 10.6 | 7.8 |
| Comparative Example 2-2-2-3 | Comparative Example 1-2-1-3 | 3.0 | b-PP | A | A | A | 9.6 | 7.5 |

TABLE 8

| Example or Comparative Example | Surface property-improving agent Type | Additive amount Parts by mass | Polyolefin resin-molded body Type of polyolefin | Bleeding | Form-ability | Mechanical properties | Initial abrasion resistance [N] | Abrasion resistance after thermal loading [N] |
|---|---|---|---|---|---|---|---|---|
| Comparative Example 2-2-1-4 | Comparative Example 1-1-1-4 | 3.0 | b-PP | A | A | A | 9.7 | 8.7 |
| Comparative Example 2-2-2-4 | Comparative Example 1-2-1-4 | 3.0 | b-PP | A | A | A | 9.6 | 7.3 |

As is clear from the results shown in Tables 5 and 6, the polyolefin resin-molded body of each example contains the surface property-improving agent of the present application, has good surface properties, and maintains good abrasion resistance even though being exposed to high-temperature conditions for a long time.

On the other hand, as is clear from the results shown in Tables 7 and 8, the polyolefin resin-molded body of Comparative Example 2-1-1-1 contains no surface property-improving agent and has poor abrasion resistance after thermal loading. The polyolefin resin-molded body of Comparative Example 2-1-1-2 contains the microcrystalline wax only and therefore has poor abrasion resistance after thermal loading. The polyolefin resin-molded body of Comparative Example 2-1-1-3 contains the silicone oil only and therefore has poor appearance and mechanical properties. The polyolefin resin-molded body of Comparative Example 2-2-1-1 contains no PDMS and therefore has poorer abrasion resistance after thermal loading as compared to the polyolefin resin-molded body of Example 2-1-1-1. The polyolefin resin-molded body of Comparative Example 2-2-1-2 contains an increased amount of PDMS and therefore has poorer appearance and mechanical properties as compared to the polyolefin resin-molded body of Example 2-1-1-3. The polyolefin resin-molded body of Comparative Example 2-2-1-3 contains a reduced amount of wax and therefore has poorer initial abrasion resistance as compared to the polyolefin resin-molded body of Example 2-1-1-1. The polyolefin resin-molded body of Comparative Example 2-2-2-1 contains no PDMS and therefore has poorer abrasion resistance after thermal loading as compared to the polyolefin resin-molded body of Example 2-2-1-1. The polyolefin resin-molded body of Comparative Example 2-2-2-2 contains an increased amount of PDMS and therefore has poorer appearance and mechanical properties as compared to the polyolefin resin-molded body of Example 2-2-1-1. The polyolefin resin-molded body of Comparative Example 2-2-2-3 contains no PDMS and therefore has poorer abrasion resistance after thermal loading as compared to the polyolefin resin-molded body of Example 2-2-1-1.

The invention claimed is:
1. A surface property-improving agent for molded bodies made of polyolefin resins, containing:
   50.0 parts to 90.0 parts by mass of a non-polar wax (A) with a melting point of 50° C. to 100° C.; and
   10.0 parts to 50.0 parts by mass of a vinyl copolymer (B) obtained by copolymerizing two types of monomers (1) and (b2), wherein the sum of the non-polar wax (A) and the vinyl copolymer (B) is 100.0 parts by mass, the monomer (b 1) is styrene and/or acrylonitrile, the vinyl copolymer (B) contains 0.1 parts to 49.9 parts by mass of the monomer (b1) and 0.1 part to 9.9 parts by mass of the monomer (b2), the sum of the monomer (b1) and the monomer (b2) is 10.0 parts to 50.0 parts by mass, and the monomer (b2) is a methacryloxypropyl polyorganosiloxane represented by the following formula (1):

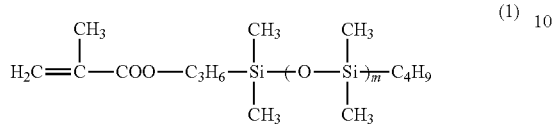

where m+1 is an integer.

2. The surface property-improving agent according to claim 1, wherein the vinyl copolymer (B) is obtained in such a manner that the two types of monomers (b1) and (b2) are copolymerized in the presence of the non-polar wax (A) using a radical polymerization initiator and the non-polar wax (A) and the vinyl copolymer (B) form a graft structure.

3. A resin composition containing 0.5 parts to 10.0 parts by mass of a surface property-improving agent per 100.0 parts by mass of a polyolefin resin, the surface property-improving agent containing:
  50.0 parts to 90.0 parts by mass of a non-polar wax (A) with a melting point of 50° C. to 100° C.; and;
  10.0 parts to 50.0 parts by mass of a vinyl copolymer (B) obtained by copolymerizing two types of monomers (b1) and (b2), wherein the sum of the non-polar wax (A) and the vinyl copolymer (B) is 100.0 parts by mass, the monomer (b1) is styrene and/or acrylonitrile, the vinyl copolymer (B) contains 0.1 parts to 49.9 parts by mass of the monomer (b1) and 0.1 part to 9.9 parts by mass of the monomer (b2), the sum of the monomer (b1) and the monomer (b2) is 10.0 parts to 50.0 parts by mass, and the monomer (b2) is a methacryloxypropyl polyorganosiloxane represented by the following formula:

represented by the following formula (1):

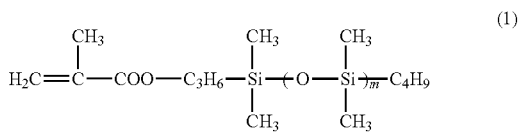

where m+1 is an integer.

4. A resin composition containing 0.5 parts to 10.0 parts by mass of the surface property-improving agent according to claim 2 per 100.0 parts by mass of a polyolefin resin.

5. A resin-molded body obtained by molding the resin composition according to claim 3.

6. A resin-molded body obtained by molding the resin composition according to claim 5.

* * * * *